(No Model.) 2 Sheets—Sheet 1.
W. R. & T. EYNON.
NUT TAPPING MACHINE.
No. 322,363. Patented July 14, 1885.
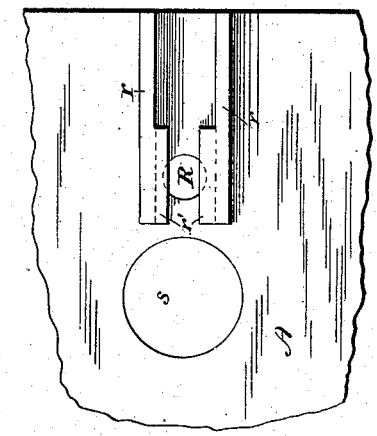
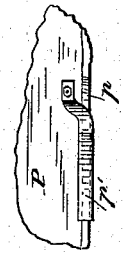
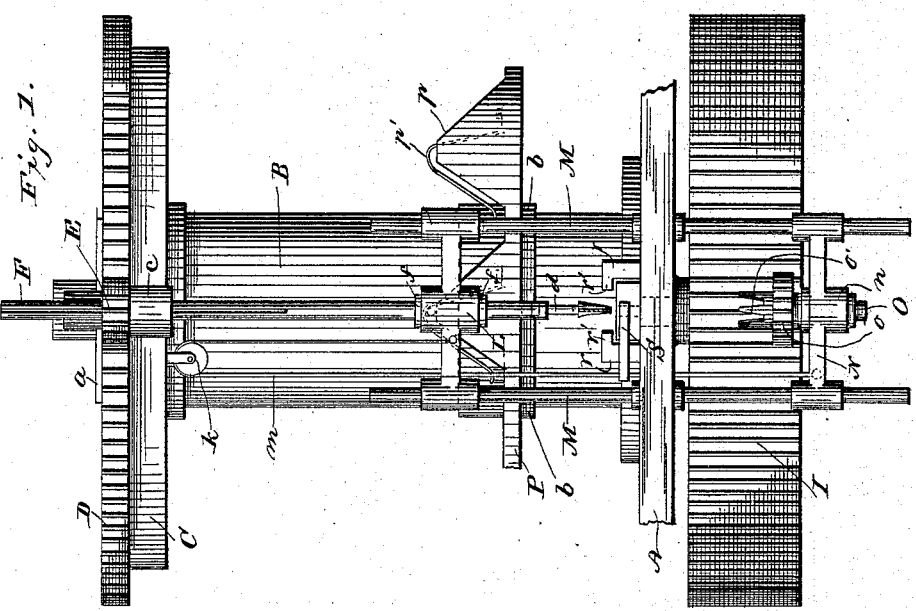
WITNESSES
Chas. R. Burr
J. M. Henderson
INVENTORS
William R. Eynon
Thomas Eynon
by Franck D. Johns
Their Attorney
N. PETERS, Photo-Lithographer, Washington, D. C.

(No Model.) 2 Sheets—Sheet 2.
W. R. & T. EYNON.
NUT TAPPING MACHINE.
No. 322,363. Patented July 14, 1885.
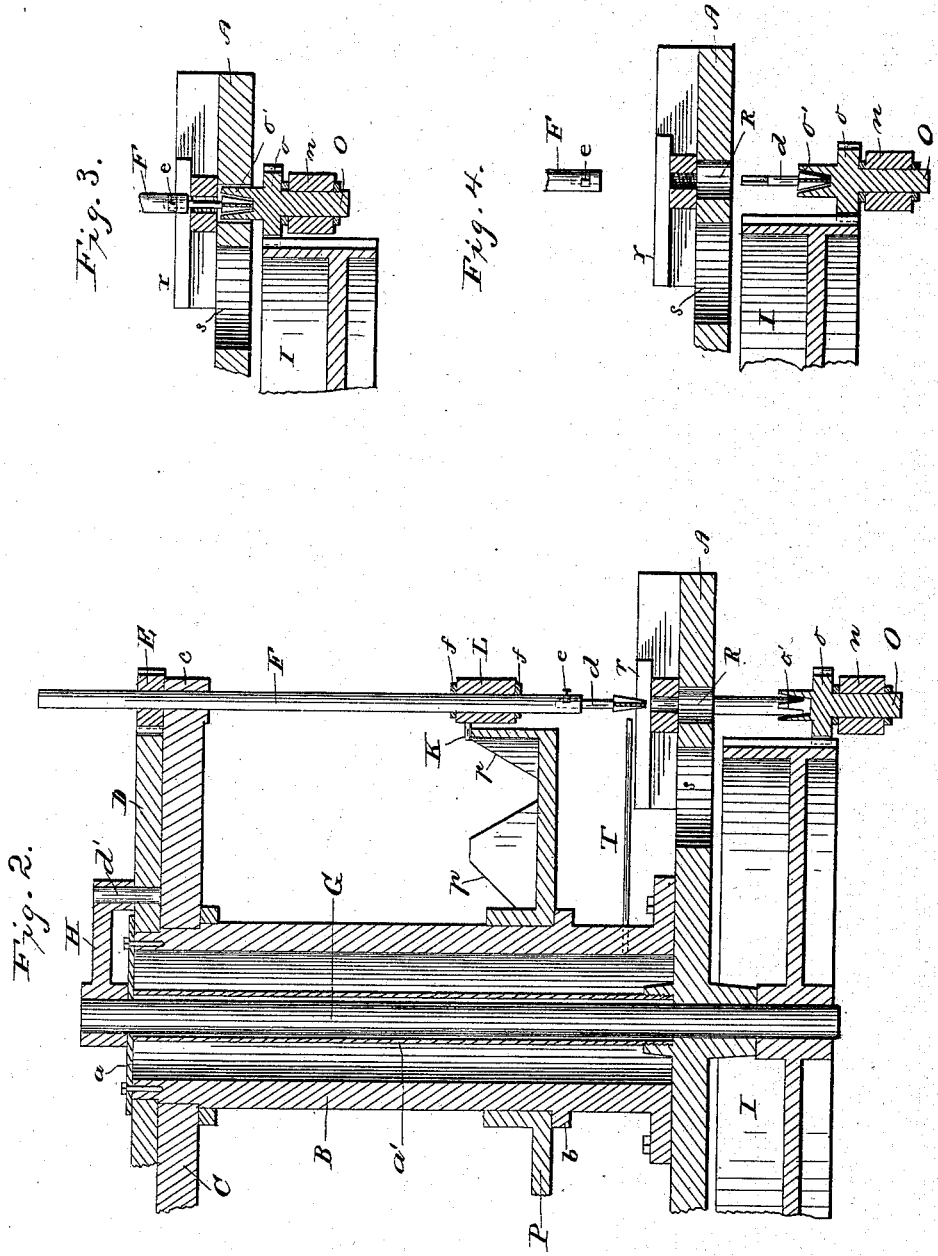
WITNESSES
Chas. R. Burr
J. W. Henderson
INVENTORS
William R. Eynon
Thomas Eynon
by Frank D. Johns
their Attorney

UNITED STATES PATENT OFFICE.

WILLIAM R. EYNON AND THOMAS EYNON, OF CLEVELAND, OHIO.

NUT-TAPPING MACHINE.

SPECIFICATION forming part of Letters Patent No. 322,363, dated July 14, 1885.

Application filed August 29, 1884. (No model.)

*To all whom it may concern:*

Be it known that we, WILLIAM R. EYNON and THOMAS EYNON, citizens of the United States, residing at Cleveland, in the county of Cuyahoga and State of Ohio, have invented certain new and useful Improvements in Nut-Tapping Machines; and we do hereby declare the following to be a full, clear, and exact description of the invention, such as will enable others skilled in the art to which it appertains to make and use the same.

Our invention relates to certain improvements in nut-tapping machines in which the nut is automatically removed from the tap after the blank has been threaded.

It consists of certain novel construction and arrangement of the various parts whereby the tap is automatically removed from the tap-spindle after the nut-blank has been threaded, is passed through the nut, the nut removed from the guides, and the tap replaced in the head of the tap-spindle ready for operation upon another blank, all of which we will now proceed to describe, reference being had to the accompanying drawings, in which—

Figure 1 is a front elevation of a machine embodying our improvement, showing the tap raised. Fig. 2 is a vertical section taken through the center of the machine, showing the tap just entering a nut-blank. Fig. 3 is a detail showing tap after it has passed through and threaded the nut. Fig. 4 is a detail showing the tap removed from the tap-spindle and held in position to be replaced. Figs. 5 and 6 are details.

Referring to said drawings, A is the main base-plate, supported by suitable legs.

B is a hollow stationary column bolted to the base-plate, and having a cap, $a$.

C is a stationary upper plate secured to the column B. Around the upper plate, C, are arranged any desired number of tap-spindles hereinafter described, which are mounted in and slide vertically in the bearings $c$. In the drawings only one tap-spindle is shown.

D is a gear-wheel, mounted on the top of the column B, and is driven by any suitable mechanism, preferably by a spur or bevel wheel and belt.

F is the tap-spindle.

E is a pinion mounted loosely on the upper part of the spindle F and feathered to it, so that said tap-spindle is operated by the gear-wheel D and pinion E, and at the same time is permitted to slide vertically through said pinion.

$a'$ is a pipe passing through the center of the column B and screwed into the base-plate.

G is a shaft passing through the pipe $a'$, having secured to its upper end the arm H, which arm is fastened to the gear-wheel D by a pin, $d'$, thus causing the shaft to revolve with and at the same speed as the gear-wheel D. On the lower end of the shaft G is mounted a gear-wheel, I, which is keyed to the shaft G, and is of the same size and pitch as the wheel D, and revolves in a like direction and at the same rate of speed as said wheel D. The tap-spindle F revolves in and is supported by a guide-head, L. Said tap-spindle is held in place by suitable collars, $f$, and has in its lower end a rectangular opening for the reception of the head of the tap-shank.

$d$ is the tap, which is held in place in the tap-spindle by a spring-pin, $e$, which is sufficiently strong to hold said tap and prevent it from falling out by its own weight, but allows it to be easily and readily withdrawn when a power greater than the weight of the tap is applied. The end of the tap-shank is shouldered to fit the opening in the spindle.

The guide-head slides upon vertical guide-rods $m$, and is provided with a pin, K, projecting from one side, for a purpose hereinafter set forth.

P is a horizontal disk, mounted on the column B at a suitable distance below the upper plate, and is supported by the annular flange $b$. On the upper surface of said disk and flush with its periphery are a series of cams, $p$, which operate against the pin K on the guide-head L as the disk is rotated, alternately raising and lowering the pin K and moving the guide-head up and down upon the guide-rods $m$.

$p'$ are flat springs, which are arranged over the cams $p$ and hold the guide-head L down.

The disk P is rotated by means of a gearing on its periphery engaging with pinions, or by any other suitable mechanism so arranged that it can be run at various rates of speed, as may be required by the size of the tap, thus giving more or less time for tapping.

m is a wire rope or chain fastened to the guide-head L, and passing up over the pulley k, which is pendent from the upper plate, C. To the other end of the rope or chain m is fastened a bracket, N, which also slides upon the guide-rods M, and has the same vertical movement as the guide-head L, but in the opposite direction, thus causing the bracket N and guide-head L alternately to approach and recede from each other as the disk P is revolved and its cams operate against the pin on the guide-head.

In the bracket N is a bearing, n, in which revolves a spindle, O. On this spindle is keyed a pinion, o, of the same size and pitch as the pinion E. Said pinion o gears with the gear-wheel I, thus giving the spindles F and O a rotary motion in the same direction and at the same speed. On the top of the spindle O is a furcated tap-carrier, o, which receives the tap when it is dropped into the same and holds it in a perfectly vertical position, ready to replace it in the tap-spindle, as hereinafter described. This tap-carrier is made to fit the tap so that it will always be held in a vertical position. The gear-wheel I has a broad periphery and permits the pinion O to slide up and down upon the same and at the same time always be in gear.

R is a hole under the tap in the base-plate A.

r are guides on the base-plate, between which the nut-blanks are fed.

r' are flanges on the guides, which fit over the edges of the nut when in position under the tap, and hold the same in place when the tap spindle and carrier are receding from each other, causing the upper part of the screw-thread on the tap to engage with the under side of the nut, and drawing the tap out of the head of the tap-spindle and dropping it through the hole R into the tap-carrier.

S is a finger, sliding in a slot in the side of the guides r. Said finger forces the nut out of the guides after it has been threaded, and causes it to drop through the hole s into a suitable receptacle arranged under the base-plate A.

The finger S can be operated by any suitable mechanism.

The column B is hollow, and is filled with oil or other lubricant, which is fed to the taps by pipes T.

The operation of our machine is as follows: A nut-blank being placed in position under the tap and immediately over the hole R, the machine is set in motion, and the weight of the tap-spindle and the spring p' forces the tap down into position to enter the nut. The tap then passes through the nut until it comes to the position shown in Fig. 3. The cam p, then coming in contact with the pin K, raises the guide-head L and tap-spindle. The upper portion of the screw-thread on the tap then engages with the under side of the nut, which is held in place by the flanges r', and the tap is withdrawn from the spindle and drops into the tap-carrier, and as the bracket and guide-head recede from each other the shank of the tap passes entirely through the nut to the position shown in Fig. 4. The nut is then removed by the finger S, and the tap-spindle and tap-carrier coming together again as the pin K slides down the cam p, the tap is replaced in the tap-spindle and raised above the base-plate a to the position shown in Fig. 1. Another blank is now put in place and the operation repeated. The tap-shank readily enters the opening in the head of the tap-spindle, as its longitudinal center is always in alignment with the longitudinal center of said tap-spindle, and both spindles revolving in the same direction and at the same rate of speed, the head of the tap-shank is always in the same relative position to the opening in the tap-spindle as when it was withdrawn.

Having thus fully described our invention, we claim as new and desire to secure by Letters Patent—

1. In a nut-tapping machine, a spindle carrying the tap and supported by a suitable guide-head, in combination with a spindle arranged in alignment with the tap-spindle, supported by a suitable sliding bracket and provided with a tap-carrier, both spindles being adapted to revolve in the same direction and at the same rate of speed and alternately to approach and recede from each other, all arranged and operating substantially as and for the purpose shown and described.

2. In a nut-tapping machine, the combination of a base-plate provided with guides for holding the nut-blanks and having a hole in said plate under the tap and of sufficient size to permit the passage of the tap through the same, a vertical tap-spindle mounted in suitable bearings supported by a sliding guide-head and carrying a detachable tap, a vertical spindle under the base-plate in alignment with the tap-spindle, supported by a sliding bracket and provided on its upper end with a tap-carrier for receiving and holding the tap when detached from its spindle, said spindles being adapted to revolve in the same direction and at the same speed and alternately to approach and recede from each other, all arranged and operating substantially as shown.

3. In a nut-tapping machine, the combination, as set forth, of a base-plate provided with guides and flanges for holding the nut-blanks in place, and a hole of sufficient size in said base-plate to permit the passage of the tap through the same, a vertical tap-spindle arranged immediately above the hole in the base-plate, mounted in a suitable bearing, supported by a sliding guide-head and carrying a detachable tap, a vertical spindle arranged immediately under the hole in the base-plate in alignment with the tap-spindle supported by a sliding bracket, and provided with a tap-carrier, a rope or chain connecting the bracket and guide-head and passing over a pulley, a disk adapted to be rotated at a variable speed, and provided with cams which engage with the guide-head, alternately raising and lowering the same, all arranged and operating substantially as and for the purpose set forth.

4. The combination of the base-plate A, having the guides $r$, flanges $r'$, and the hole R, the tap-spindle F, supported by the sliding guide-head L, the detachable tap $d$, the spindle O, supported by the sliding bracket N, and provided with the tap-carrier $o'$, the guide rods M, the chain or rope $m$, connecting the guide-head L and bracket N and passing over the pulley $k$ and the disk P, provided with cams $p$, all arranged and operating substantially as shown and described.

5. The combination of the base-plate A, provided with the guides $r$ and flanges $r'$ and hole R, the hollow column B, upper plate, C, gear-wheels D and I, connected by the shaft G, the tap-spindle F, mounted in a bearing in plate C, supported by a sliding guide-head, L, and having a pinion, E, mounted loosely on and feathered to said spindle, and carrying the detachable tap $d$, the spindle O, mounted in and supported by the sliding bracket N, provided with the tap-carrier $o'$, and having the pinion $o$ keyed to the same, all arranged and operating substantially as and for the purpose set forth.

6. The combination of the base-plate A, provided with the guides $r$, flanges $r'$, and hole R, the hollow column B, upper plate, C, gear-wheels D and I, connected by the shaft G, the tap-spindle F, mounted in a bearing in plate C, supported by a sliding guide-head, L, provided with a pin, $k$, on one side, a pinion, E, mounted loosely on and feathered to said spindle F, a detachable top, $d$, spindle O, provided with the tap-carrier $o'$, and having the pinion $o$ keyed to the same and supported by and mounted in the sliding bracket N, the guide-rods M, the rope $m$ passing over the pulley $k$ and connecting the brackets N and guide-head L, and the disk P, provided with cams $p$, all arranged and operating substantially as shown and described.

7. In a nut-tapping machine, the base-plate A, upper plate, C, hollow column B, pipe $a'$, and pipe T, in combination with the gear-wheel D, pinion E, tap-spindle F, and detachable tap $d$, substantially as shown and described.

In testimony whereof we affix our signatures in presence of two witnesses.

WILLIAM R. EYNON.
THOMAS EYNON.

Witnesses:
JAMES NUAGLE,
J. C. BLOCH.